April 30, 1929.     H. A. DAVOL     1,711,227
TWO-PIN SHUTTLE FRICTION DEVICE
Filed March 26, 1928     2 Sheets-Sheet 1.

INVENTOR.
Harry A. Davol
BY
Gardner A. Pearson
ATTORNEY.

Patented Apr. 30, 1929.

1,711,227

UNITED STATES PATENT OFFICE.

HARRY A. DAVOL, OF METHUEN, MASSACHUSETTS, ASSIGNOR TO U. S. BOBBIN & SHUTTLE CO., OF PROVIDENCE, RHODE ISLAND, A CORPORATION OF RHODE ISLAND.

TWO-PIN SHUTTLE FRICTION DEVICE.

Application filed March 26, 1928. Serial No. 264,698.

This invention is a friction device for shuttle threader blocks such as are used in shuttles, particularly those of the self-threading type.

It is particularly useful because of the compactness and ready adjustability of its parts whereby in the same shuttle very fine, fragile yarn or thread can be used, or relatively coarse strong thread. If any of the parts break or become useless, in most cases they can be removed without taking the shuttle block out of the shuttle, but in every case all of the friction parts on which there is any wear can be readily removed and replaced by others.

I am aware that there are a number of friction devices which include friction plates, a spring and an adjusting screw but I believe my device is simpler, more easily repaired and less likely to get out of order than any others.

This application is a continuation in part of application for patent on friction device for shuttles filed by me April 19, 1927, Serial No. 185,001.

In the drawings, Fig. 1 is a plan view of a shuttle with my device in place, part being broken away to show the construction.

Figure 1:
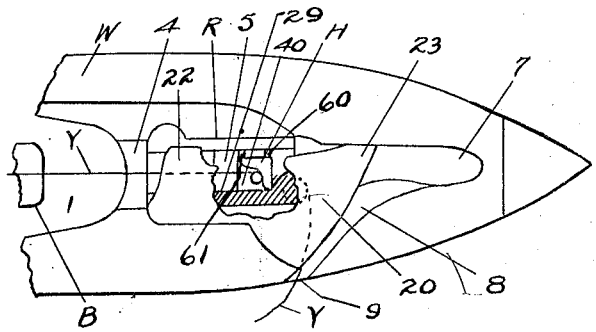
Figure 2:
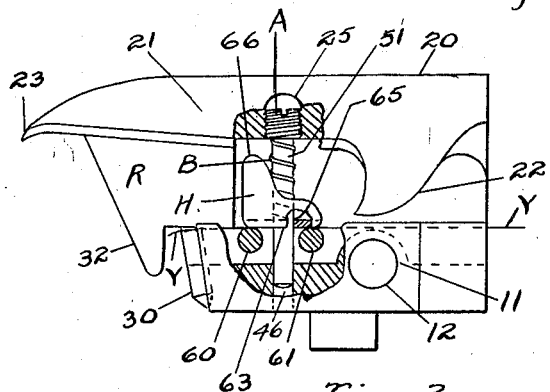
Fig. 2 is an elevation of a shuttle block from the side opposite the shuttle eye in the wood shown as removed from the shuttle.

In the accompanying drawings W indicates the body of a shuttle having a bobbin recess 1 in which is positioned the bobbin B of the usual kind and from which the thread Y extends through the threader block R in substantially the usual manner. There is the usual threading chamber 4 in the wood, and the corresponding threading chamber 5 in the threading block.

The top 20 of this block R serves as a guide and slopes downward at 21 to a front guide 23, and at the back to a back hook or back guide 22 in a well known manner, and across and down over the longitudinal middle line of the shuttle.

The horn 32 is of the usual construction and the thread pin 30 may be vertical or may slope down and back to help keep the yarn down in its proper place.

My friction device comprises two parts. The first consists of two pins which pass transversely across the bottom part of the threading chamber 5 and which may be of hard steel, glass, porcelain, felt or any other suitable material, and a movable top friction plate which rests either on these pins or passes down between them.

It is obvious that when these friction pins become worn they can be taken out and replaced by others by merely removing the threader block and knocking them out. They can then be turned or replaced by others.

The top friction member is preferably a plate of sheet metal but in any case is flat on the bottom where it rests on the friction pins, or if it extends down between them, it is preferably curved so that the thread can pass over the pins and under the plate without being cut. The edge of this movable friction plate which is nearest the shuttle eye is preferably so formed that it can slip up and down along the adjoining side wall 29 of the threading chamber 5, and this point of contact is made vertical whereby the plate is prevented from turning.

Through the top of the threader block R is a threaded pin head hole 25 and directly under this is a tension screw pin hole in the top friction plate.

I prefer to use a tension screw pin A having a threaded head 50 which is screwed into the pin head hole 25, and has a reduced shank 51 which is preferably of hardened steel and passes down through the screw pin hole in the friction plate. This screw pin A is encircled by a tension spring B between its head 50 and the top of the friction plate H. By turning this screw pin A, the tension on the spring B can be altered as desired.

Preferably the bottom end of screw pin A is steadied by being extended into a hole as 46 in the bottom of block R.

I prefer to strengthen by friction block by forming an integral sleeve 11 around the attaching bolt hole 12. This also serves the purpose of lifting up the thread and helping to guide it between the friction plate and the friction pins.

The movable friction plate preferably has an upwardly extending guide tongue which extends up from its side edge which is farthest away from the shuttle eye to the point up and in between the front hook or guide 23 and the back hook or guide 22, in such manner that it keeps the thread away from spring B and from being entangled therewith. This guide tongue may be made in various forms as will be explained.

60 and 61 are transverse horizontal friction pins and on these rests the bottom part 63 of friction plate H. This plate has a guide edge 62 which engages and is slidable along the side wall 29 of threading chamber 5. 66 is the guide tongue which extends up and forward as shown. There is also a hole 65 in plate H and a hole 46 in the bottom of the block for the passage of the shank 51 of screw pin A.

Figure 4:
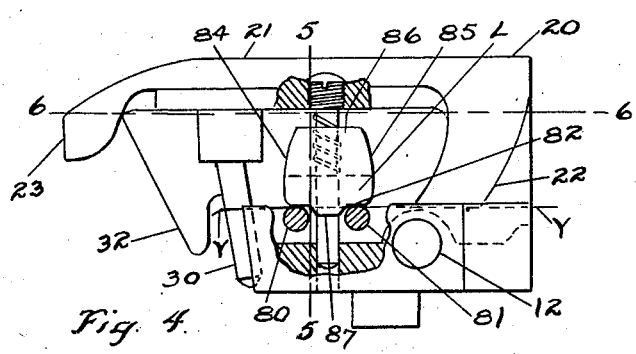
Fig. 4 is a view similar to Fig. 2 of a modification.
Figure 5:
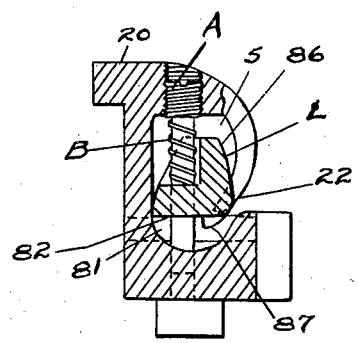
Fig. 5 is a section from the left on the line 5—5 of Fig. 4.
Figure 6:
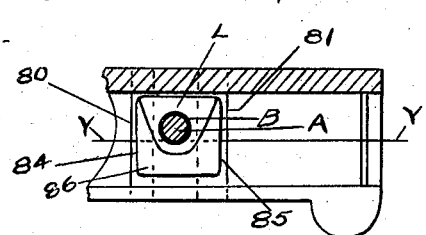
Fig. 6 is a section on the line 6—6 of Fig. 4.

In Figs. 4, 5 and 6, I show two friction pins 80, 81 on which the bottom 82 of the friction plate L rests. In this case, the guide tongue 86 extends at the exposed side around the spring and screw pin in a suitable curve and down along as sides 84 and 85 so that the spring is thoroughly protected. The locking tooth 87 projects down and keeps the thread from slipping out.

Figure 7:
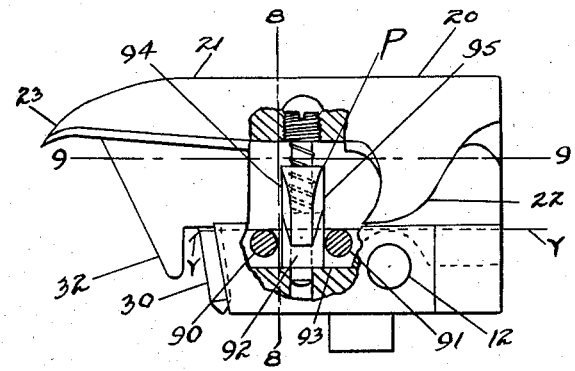
Fig. 7 is a view similar to Fig. 2 of another modification.
Figure 8:
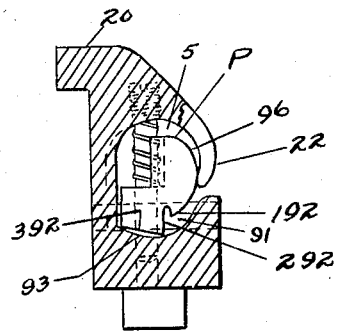
Fig. 8 is a view from the left on line 8—8 of Fig. 7.
Figure 9:
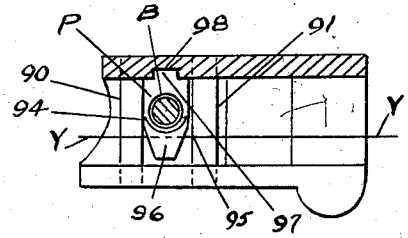
Fig. 9 is a view looking down on the line 9—9 of Fig. 7.

In Figs. 7, 8 and 9, I show the two friction pins 90 and 91 between which the bottom part 92 of the friction plate P extends, resting on the part 93 of the threading block, and in this case the guide tongue 96 is narrower than that shown in Fig. 4 but extends up in a curve on the exposed side of the spring and thence down on each side at 94 and 95.

In this case also the side wall is not flat but has a vertical recess 98 into which the tongue 97, from the edge of friction plate P, extends. It is obvious that many forms could be given to this side wall provided the adjoining edge of the friction plate fitted.

The bottom part 92 of the top friction plate has a hook 192 slightly below the tops of pins 90 and 91 and slopes down and back at 292 to a flat section 392 which rests on 93. This construction helds the thread to get in position where it runs over pins 90 and 91 and under book 192.

Figure 10:
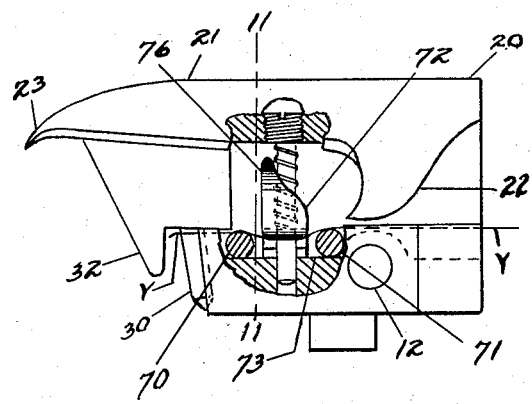
Fig. 10 is a view similar to Fig. 2, of another modification.
Figure 11:
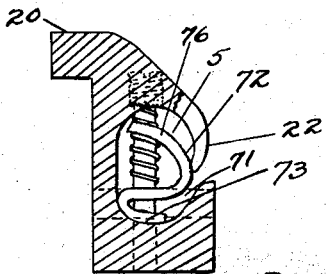
Fig. 11 is a sectional view looking from the left on the line 11—11 of Fig. 10.

In Figs. 10 and 11, I show two friction pins 70 and 71, but instead of resting upon them, the friction plate 72 extends down between them and rests on the part 73 of the threading block.

Its bottom edges are preferably rounded from front to back and it has a guide tongue 76. In this case as in Figs. 7, 8 and 9, the friction on the thread is caused more by passing over one pin and thence under the plate, and thence up over the other pin than by passing between two surfaces.

I can use one pin with a tooth each side as shown in the application of which this is a division but I prefer to use two pins preferably of glass or hardened steel with a tooth between them, because if one side of the friction plate jumps, the other remains in contact with the other pin.

This is important especially with rayon thread which may be one two-thousandth of an inch in thickness but which has a tendency to wave if there is not a steady regular friction.

It is desirable that the top part of the shuttle block which serves as a thread guide should direct the thread down to the horn as 32 and that the pull of the thread around the horn should cause it to slide down along the outside of the tongue of the top friction plate until it slips in between that plate or part of it and the friction pins.

Figure 3:
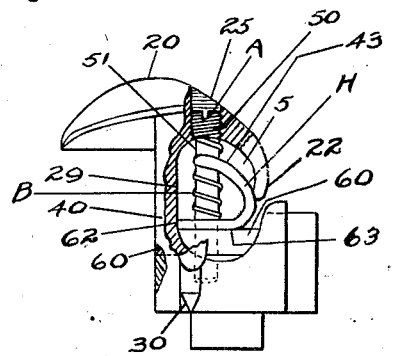
Fig. 3 is a front elevation as from the left of Fig. 2.
Figure 12:
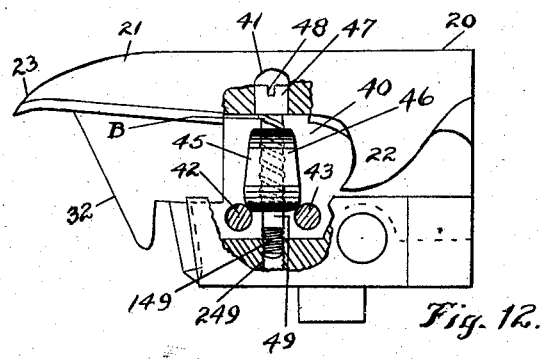
Fig. 12 is a view similar to Fig. 10 of another modification.

As shown in Fig. 12, I can use in connection with a threading block having a threading chamber 40 and a screw pin hole 41, which however is not threaded, the two friction pins 42 and 43. These friction pins extend across the threading chamber near the bottom leaving a space between just below screw pin hole 41. The friction plate 45 is rounded at the bottom, front and back where it partly rests on the pins 42 and 43, and partly extends down between them. The guide tongue 46 is curved in a manner similar to H in Fig. 3 so that the thread will slip down smoothly from the guide 21 and the back guide 22 lifting 45 slightly if necessary and getting into position over the pins 42 and 43 and under friction plate 45. Plate 45 has a screw pin hole, not shown, through which the shank 49 and its threaded end 149 pass into a threaded hole 249 in the bottom of the threading block.

The part of this shank 49 which is likely to come in contact with the thread is smooth, and where it extends up to the head 47, is surrounded by the spring B as in the other construction. The head 47 is not threaded and the turning slot 48 can be reached with a screw driver passed down through the screw pin head hole 41.

I claim:

1. The combination in a threading block for shuttles in which there is a threading chamber having a side wall and a screw pin head hole; of two friction pins which extend across the bottom of the threading chamber; a friction plate which rests upon said friction pins and which has a thread retaining tooth extending down between them; said friction plate also having an edge in contact with the side wall, a curved upwardly projecting guide tongue and a tension screw pin hole; a headed screw pin which engages the screw pin head hole and which passes through the pin hole in the friction plate; and a tension spring which surrounds the shank of the screw pin between its head and the friction plate.

2. The combination in a threading block for shuttles in which is a threading chamber having a side wall and a screw pin head hole; of two friction pins which extend across the bottom of the threading chamber; a friction plate which rests upon said friction pins; said friction plate also having an edge in contact with the side wall, a curved upwardly projecting guide tongue and a tension screw pin hole; a headed screw pin which engages the screw pin head hole and which passes through the pin hole in the friction plate; and a tension spring which surrounds the shank of the screw pin between its head and the friction plate.

3. The combination in a threading block for shuttles in which is a threading chamber and a screw pin head hole; of two friction pins which extend across the threading chamber near the bottom thereof leaving a space between below the screw pin hole; a friction plate in operative relation with said friction pins, said friction plate having a curved upwardly projecting guide tongue and a tension screw pin hole; a headed screw pin which engages the screw pin head hole and which passes through the pin hole in the friction plate; and a tension spring which surrounds the shank of the screw pin between its head and the friction plate.

4. The combination in a threading block for shuttles in which is a threading chamber and a screw pin head hole; of two friction pins which extend across the threading chamber near the bottom thereof leaving a space between below the screw pin hole; a friction plate in operative relation with said friction pins, said friction plate having a curved upwardly projecting guide tongue and a tension screw pin hole; a headed screw pin which passes through the screw pin head hole and which passes through the pin hole in the friction plate into the bottom of the threading chamber; and a tension spring which surrounds the shank of the screw pin between its head and the friction plate.

HARRY A. DAVOL.